(12) United States Patent
Barraci et al.

(10) Patent No.: US 8,751,068 B2
(45) Date of Patent: Jun. 10, 2014

(54) AIRCRAFT TASK MANAGEMENT SYSTEM

(75) Inventors: Nima Barraci, Hessen (DE); Andreas Sindlinger, Weinheim (DE); Thorsten Wiesemann, Hofheim (DE)

(73) Assignee: The Boeing Company, Chicago, IL (US)

( * ) Notice: Subject to any disclaimer, the term of this patent is extended or adjusted under 35 U.S.C. 154(b) by 457 days.

(21) Appl. No.: 13/101,789

(22) Filed: May 5, 2011

(65) Prior Publication Data

US 2012/0283897 A1    Nov. 8, 2012

(51) Int. Cl.
*G05D 1/00* (2006.01)
*G01C 23/00* (2006.01)

(52) U.S. Cl.
USPC .................................................. 701/3

(58) Field of Classification Search
CPC .......................... G06Q 10/06316; G06Q 50/30
USPC .................................................. 701/3
See application file for complete search history.

(56) References Cited

U.S. PATENT DOCUMENTS

| 6,633,801 B1 * | 10/2003 | Durlacher et al. ............... 701/9 |
| 7,702,427 B1 * | 4/2010 | Sridhar et al. ............... 701/4 |
| 2006/0151670 A1 * | 7/2006 | Loss et al. .............. 244/129.2 |
| 2007/0142980 A1 | 6/2007 | Ausman et al. |
| 2009/0108140 A1 | 4/2009 | Adams et al. |
| 2010/0036547 A1 * | 2/2010 | Myers et al. .................... 701/3 |

FOREIGN PATENT DOCUMENTS

GB     2050979 A  *  1/1981

OTHER PUBLICATIONS

EP search report dated Aug. 1, 2012 regarding application 12166899.0-1238, reference P54532EP/RHBH, applicant The Boeing Company.
Mudgett et al., "Untangling the web of wires" Boeing Frontiers Online, Apr. 2006, vol. 4, issue 11, pp. 1-3.
SESAR Definition Phase—The Concept of Operations at a glance, pp. 1-53, SESAR consortium, retrieved Apr. 27, 2011 www.sesar-consortium.aero.
Bauer et al., "An Application for Detecting Potential Traffic Conflicts in Areas with Unreliable ATC", International Conference on Research in Air Transportation, Belgrade, Serbia and Montenegro; 2005, pp. 1-6.

* cited by examiner

*Primary Examiner* — Fadey Jabr
*Assistant Examiner* — Yazan A Soofi
(74) *Attorney, Agent, or Firm* — Yee & Associates, P.C.

(57) ABSTRACT

A method and apparatus for managing tasks in an aircraft. A current state of the aircraft is identified. A group of tasks is identified using a task database and the current state of the aircraft. The task database comprises the tasks for performance during different phases of flight of the aircraft by a flight crew and the group of tasks comprises different types of tasks from the tasks. The group of tasks is presented in a computer system.

20 Claims, 10 Drawing Sheets

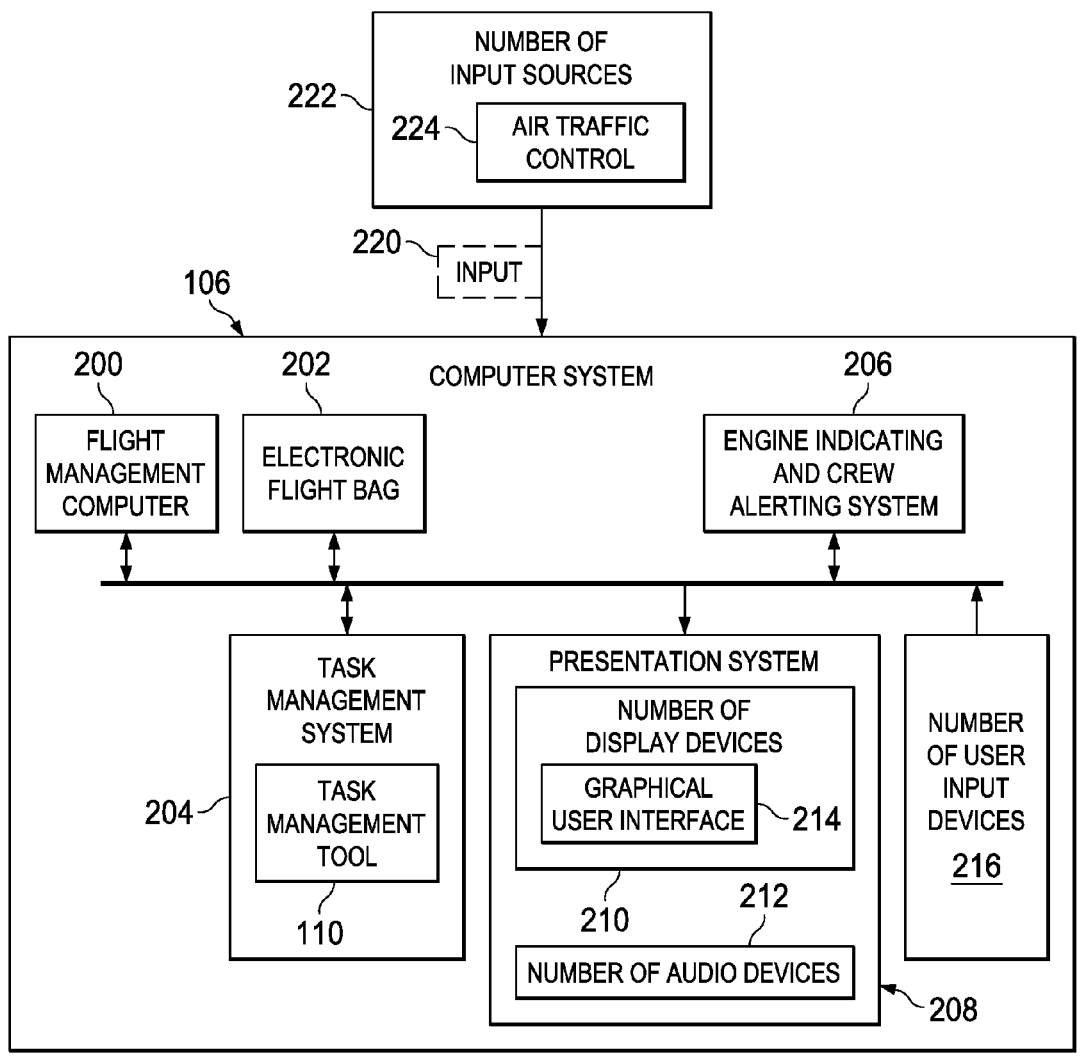

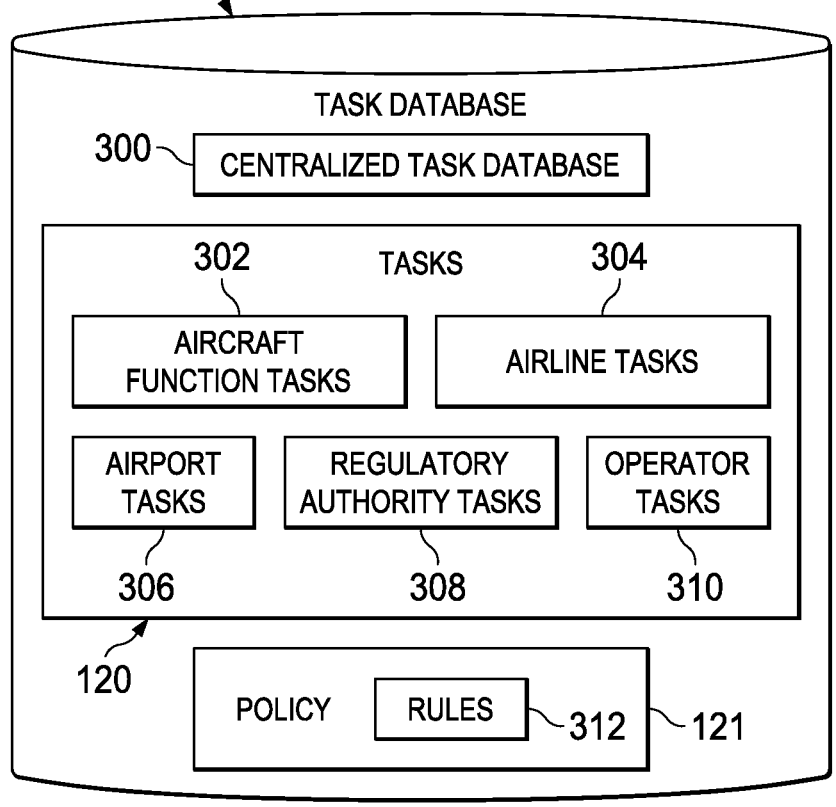
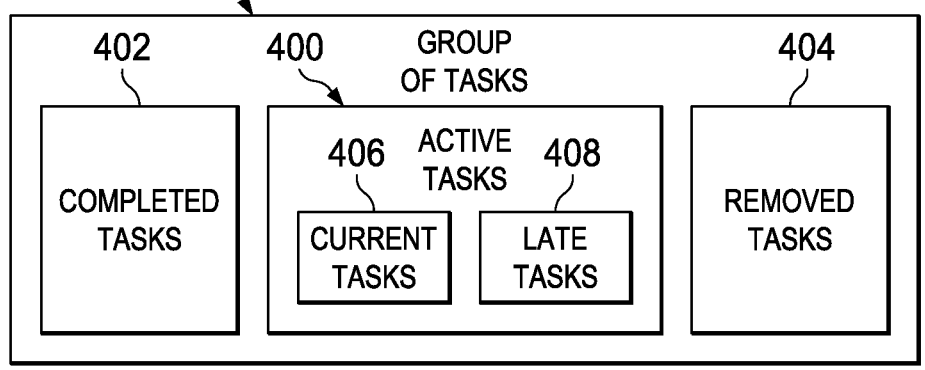

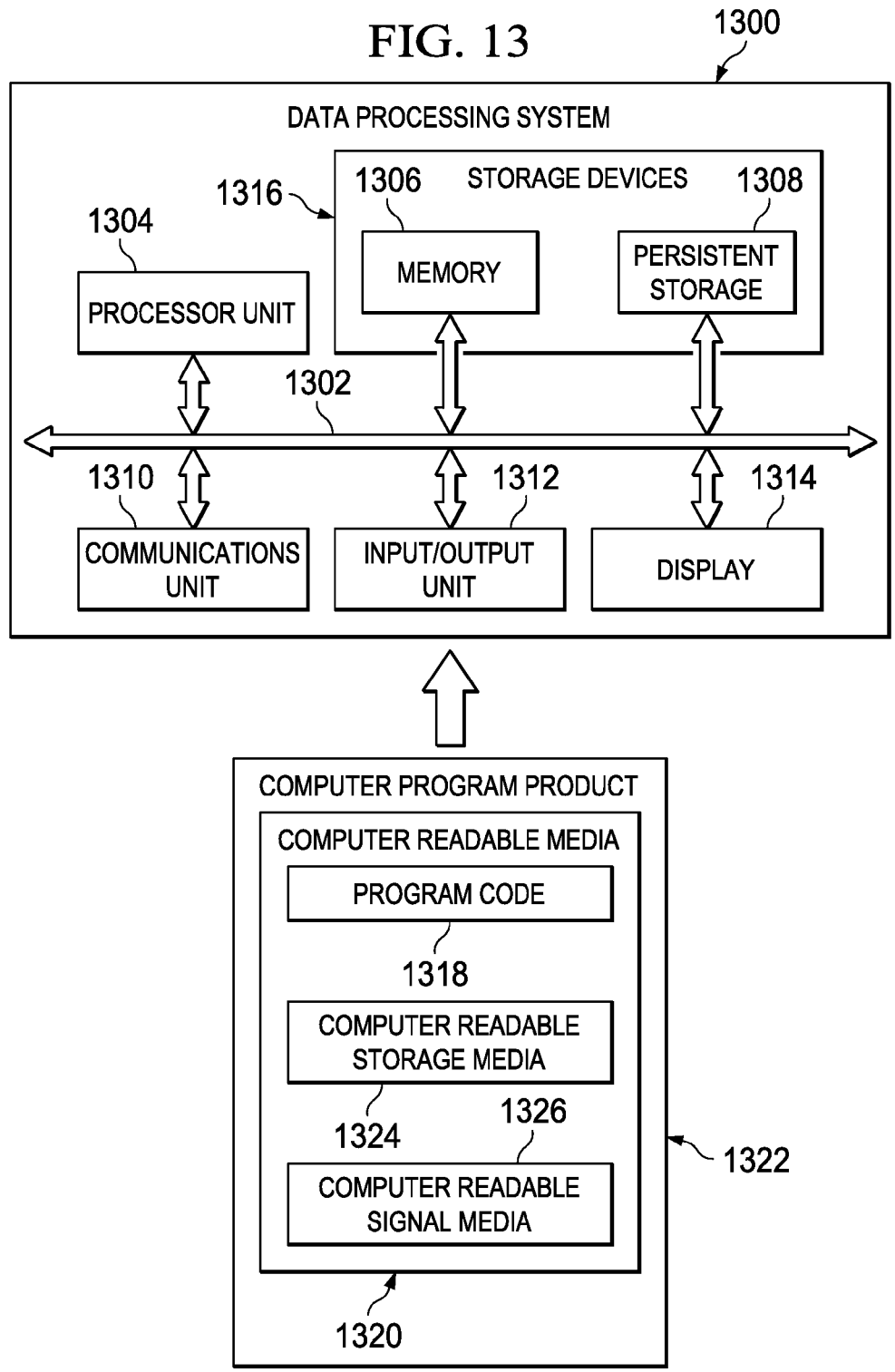

AIRCRAFT TASK MANAGEMENT SYSTEM

BACKGROUND INFORMATION

1. Field

The present disclosure relates generally to aircraft and, in particular, to operating an aircraft. Still more particularly, the present disclosure relates to a method and apparatus for managing tasks for operating an aircraft.

2. Background

In operating an aircraft, the flight crew performs many different tasks. Some of these tasks are based on regulations, such as those from the Federal Aviation Agency (FAA). Other tasks may be based on procedures for a particular airline, aircraft, or for some other organization.

For example, before a flight occurs, a pre-flight information checklist is used to perform different tasks. The checklist may be used to perform a sequence of tasks to prepare the flight crew and aircraft for flight. For example, these tasks may include checking the overall aircraft structure, checking air vents and pitot tubes for obstructions, looking at tires for wear, checking fuel for the aircraft, and other related tasks for preparing to fly an aircraft. When the aircraft is on a taxiway, an additional group of tasks may be performed for traveling to the runway and for takeoff from the runaway.

Currently, the identification of tasks for operating an aircraft is commonly made using checklists. These checklists are especially useful for commercial aircraft, in which high workload situations may be present for the flight crew. The checklists aid in maintaining a desired level of comfort and safety for the flight.

Although checklists are useful, performing task using the checklists involves the flight crew following the checklists and knowing which checklists to use. Different checklists may be present for different airports, locations, and countries.

Knowing when and whether to perform these and other tasks may still be challenging, even with the use of checklists. The management of checklists may take more time than desired. As a result, the workload on the flight crew may increase and/or additional crew members may be needed to operate the aircraft.

Therefore, it would be advantageous to have a method and apparatus that takes into account at least some of the issues discussed above, as well as other possible issues.

SUMMARY

In one illustrative embodiment, a method for managing tasks in an aircraft is provided. A current state of the aircraft is identified. A group of tasks is identified using a task database and the current state of the aircraft. The task database comprises the tasks for performance during different phases of flight of the aircraft by a flight crew, and the group of tasks comprises different types of tasks from the tasks. The group of tasks is presented in a computer system.

In another illustrative embodiment, a task management system comprises a computer system. The computer system is configured to identify a current state of an aircraft. The computer system is further configured to identify a group of tasks using a task database and the current state of the aircraft. The task database comprises tasks for performance during different phases of flight of the aircraft by a flight crew. The group of tasks comprises different types of tasks from the tasks. The computer system is further configured to present the group of tasks in the computer system.

In yet another illustrative embodiment, a computer program product comprises a computer readable storage medium, first program code, second program code, and third program code. The first program code is for identifying a current state of an aircraft. The second program code is for identifying a group of tasks using a task database and the current state of the aircraft. The task database comprises tasks for operating the aircraft by a flight crew. The task database further comprises tasks for performance during different phases of flight of the aircraft by a flight crew. The group of tasks comprises different types of tasks from the tasks. The third program code is for presenting the group of tasks in a computer system. The first program code, the second program code, and the third program code are stored on the computer readable storage medium.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

FIG. 2 is an illustration of a block diagram of a computer system on an aircraft with a task management tool in accordance with an illustrative embodiment;

FIG. 3 is an illustration of a task database in accordance with an illustrative embodiment;

FIG. 4 is an illustration of a group of tasks in accordance with an illustrative embodiment;

FIG. 13 is an illustration of a data processing system in accordance with an illustrative embodiment.

DETAILED DESCRIPTION

The different illustrative embodiments recognize and take into account a number of different considerations. "A number", as used herein with reference to items, means one or more items. One consideration recognized and taken into account by the different illustrative embodiments is that checklists currently used by aircraft crew are static. As a result, the aircraft crew may use a different checklist for different airports, different countries, different aircraft, and/or different airlines.

For example, one aircraft may have one checklist for pre-flight tasks, while another aircraft may have a different checklist. Although the checklist may be similar, the differences in tasks may be important in properly performing a pre-flight check of the different aircraft. The different illustrative embodiments recognize and take into account that unexpected events may require a different set of tasks to be performed. These unexpected events may have another checklist that the flight crew needs to see when that event occurs. Thus, the use of checklists may be more cumbersome and difficult to use than desired.

The different illustrative embodiments also recognize and take into account that it would be advantageous to have a more efficient system for managing tasks in an aircraft.

Thus, the different illustrative embodiments provide a method and apparatus for managing tasks in an aircraft. In one illustrative embodiment, a current state of the aircraft is identified. A group of tasks is identified using a task database in the current state of the aircraft. The task database comprises tasks for operating the aircraft by flight crew. The group of tasks is then presented in a computer system.

A task is a piece of work that is performed by an operator. A task may be, for example, a job, a step, an operation, or some other piece of work. Also, as used herein, "a group", when used with reference to an item, means one or more items. For example, "a group of tasks" is one or more tasks.

Figure 1:
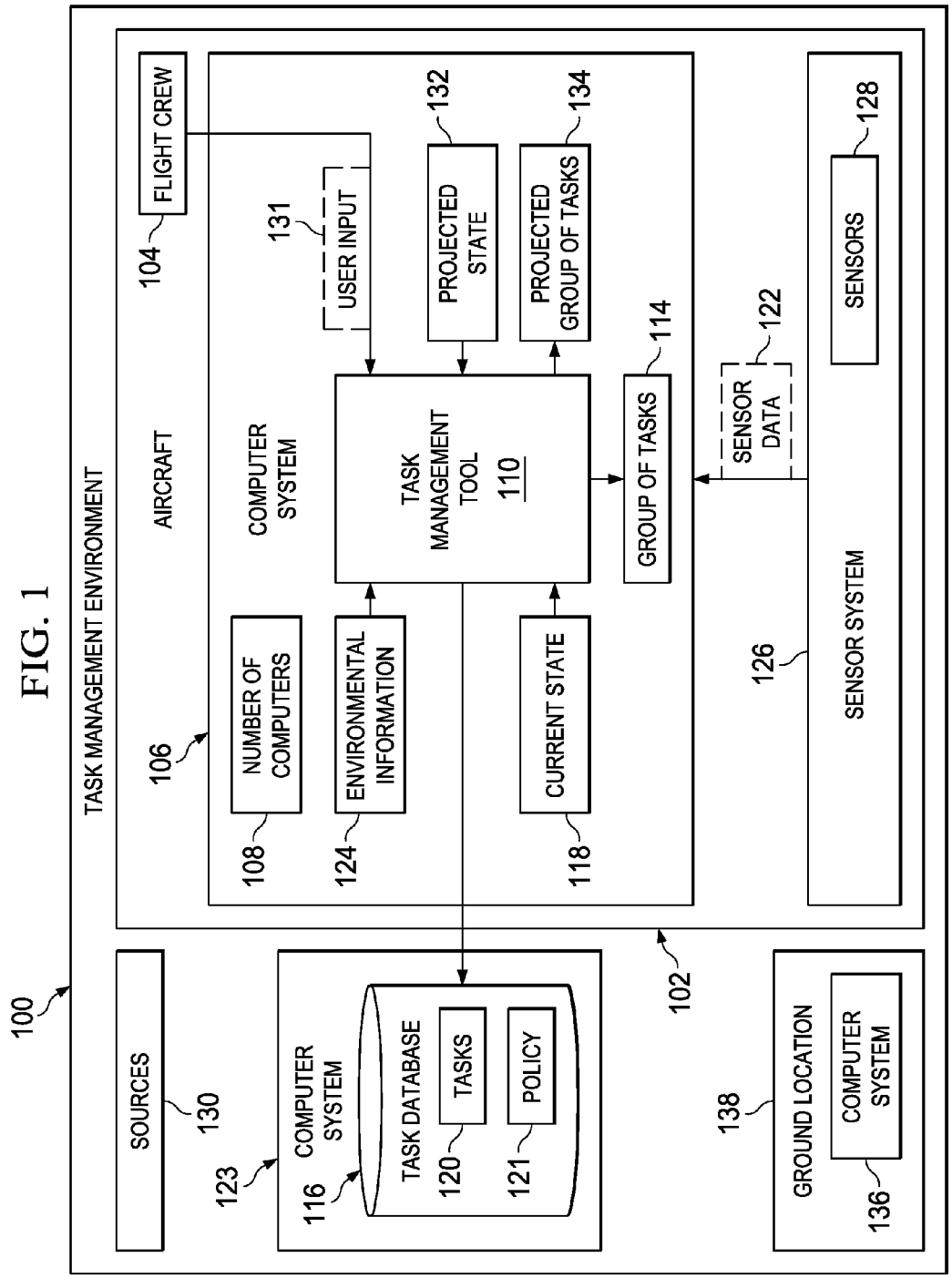
FIG. 1 is an illustration of a block diagram of a task management environment in accordance with an illustrative embodiment.

With reference now to the figures and, in particular, with reference to FIG. 1, an illustration of a block diagram for a task management environment is depicted in accordance with an illustrative embodiment. Task management environment 100 includes aircraft 102 with flight crew 104. Flight crew 104 operates aircraft 102.

In these illustrative examples, aircraft 102 has computer system 106. Computer system 106 comprises number of computers 108. "A number", as used herein with reference to items, means one or more items. For example, "a number of computers" may be one or more computers.

In this illustrative example, task management tool 110 is located in computer system 106. Task management tool 110 may be software, hardware, or a combination of the two. In the illustrative examples, task management tool 110 takes the form of program code that runs on one or more of number of computers 108 in computer system 106.

In these illustrative examples, task management tool 110 identifies group of tasks 114 for performance by flight crew 104. Tasks 120 are tasks that are performed by flight crew 104 in operating aircraft 102.

Group of tasks 114 is identified by task management tool 110 using task database 116 and current state 118. Current state 118 is a current state of aircraft 102. Task database 116 comprises tasks 120.

In this illustrative example, task database 116 is remote from aircraft 102. In this illustrative example, task database 116 is located at computer system 123, which is in one or more locations remote to aircraft 102. Computer system 123 may be located at, for example, without limitation, an airline, an air traffic control tower, an airport, and/or some other suitable location.

In other words, tasks 120 are not merely tasks for a checklist. Instead, tasks 120 may be selected and organized in any manner needed to perform tasks to operate aircraft 102 and perform other operations for the flight through different phases of flight for aircraft 102. In other words, task database 116 is not an electronic checklist for a particular procedure to operate aircraft 102.

Tasks 120 in task database 116 are tasks that may be performed by flight crew 104 for aircraft 102 during different phases of flight of aircraft 102. Tasks 120 may be based on various sources. For example, tasks 120 may include tasks defined by airline operating procedures, procedures for the particular aircraft, regulations and procedures for an airport, regulations from the Federal Aviation Agency (FAA), and/or other suitable sources.

Task database 116 also includes policy 121. Policy 121 is a number of rules that may be applied to identify tasks in tasks 120 to form group of tasks 114. Policy 121 may include data that is used with the number of rules to identify tasks in tasks 120 for group of tasks 114.

Current state 118 may be identified using at least one of sensor data 122, environmental information 124, and other suitable types of information. In these illustrative examples, sensor data 122 is the data obtained using sensor system 126 in aircraft 102. Sensor system 126 generates and sends sensor data 122 to computer system 106. Sensor system 126 comprises sensors 128.

In these illustrative examples, sensors 128 may include, for example, at least one of a global positioning system receiver, a temperature sensor, an accelerometer, an inertial measurement unit, a pitot tube, an oxygen sensor, a radar system, a transducer, and other suitable types of sensors. Sensor data 122 generated by sensors 128 may include, for example, without limitation, a temperature inside aircraft 102, a temperature outside of aircraft 102, a pressure, a position of aircraft 102, a humidity level, an oxygen level in a cabin of aircraft 102, and other suitable types of data.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

In these illustrative examples, current state 118 is identified using sensor data 122 from sensor system 126, environmental information 124, and other suitable information. In these illustrative examples, environmental information 124 may be any information about the environment around aircraft 102 that may affect what tasks are to be performed by flight crew 104. For example, without limitation, environmental information 124 may include current weather information, weather forecasts, information about the status of runways at an airport, and other suitable types of information. In these illustrative examples, environmental information 124 is received from sources 130. Sources 130 may include an airline, an airport, an air traffic control station, a weather service, and/or other suitable types of sources.

In some illustrative examples, current state 118 may be identified using information received from other aircraft. For example, aircraft 102 may receive messages from another aircraft identifying a position, airspeed, direction of travel, and/or other suitable information about a current state for the other aircraft. These messages may be received using, for example, automatic dependent surveillance-broadcast (ADS- B). A task in tasks 120 may be selected for group of tasks 114 based on the information received from the other aircraft. Further, in some cases, a new task may be generated and/or a task selected for group of tasks 114 may be updated in response to a change in a current state for the other aircraft.

Current state 118 changes at different times during the operation of aircraft 102. For example, sensor data 122 and environmental information 124 may change. These changes result in computer system 106 identifying a change for current state 118. As current state 118 changes, task management tool 110 may change group of tasks 114.

In these illustrative examples, group of tasks 114 is presented in computer system 106. The presentation of group of tasks 114 may be presented visually, audibly, or a combination of the two.

In addition to identifying group of tasks 114 based on current state 118, flight crew 104 may view tasks for other states of aircraft 102 other than current state 118. As one illustrative example, if flight crew 104 desires to see what tasks will be performed at a later point in time in the flight, flight crew 104 may send input to task management tool 110 for projected state 132. In these illustrative examples, projected state 132 is a state of aircraft 102 other than current state 118.

Projected state 132 may be selected to be at a particular point in time. The point in time may be, for example, a time and/or a phase of flight. The input may be user input that defines projected state 132 or selects projected state 132 in task management tool 110.

With the selection of projected state 132, task management tool 110 identifies projected group of tasks 134 using task database 116 and projected state 132 of aircraft 102. Additionally, in some illustrative examples, projected group of tasks 134 may also be identified based on projected states for other aircraft near aircraft 102 or within a selected range of aircraft 102. Projected group of tasks 134 may be presented in computer system 106 to flight crew 104.

In this manner, flight crew 104 may view group of tasks 114 that needs to be performed based on current state 118 of aircraft 102. The selection of group of tasks 114 by computer system 106 avoids flight crew 104 searching for appropriate checklists to identify task performance.

With task management tool 110 being configured to identify projected group of tasks 134 for projected state 132, flight crew 104 may view and plan for upcoming tasks to be performed at other times during flight. For example, flight crew 104 may select projected state 132 as an approach to an airport for landing, a descent phase of the flight, or some other projected state.

Further, flight crew 104 may select multiple projected states to see how tasks that flight crew 104 are to perform will change during the flight. Further, projected state 132 takes into account environmental information 124 at a future time. This environmental information may include, for example, the weather forecast for projected state 132.

Further, with task management tool 110 updating group of tasks 114 as current state 118 changes for aircraft 102, flight crew 104 has time to perform other operations or duties rather than determining what tasks have been performed and have not been performed.

In addition to selecting tasks for group of tasks 114 based on current state 118 and environmental information 124, task management tool 110 also may add tasks to group of tasks 114 based on user input 131. User input 131 may be generated by flight crew 104 in these illustrative examples. In other illustrative examples, user input 131 may be entered by a remote operator, such as a dispatcher, an air traffic controller, or some other operator. In this manner, group of tasks 114 may be updated before or during the flight of aircraft 102 to provide flight crew 104 with tasks that are to be performed.

The illustration of task management environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, task management tool 110 may be located in a location other than aircraft 102. For example, task management tool 110 may run on computer system 136 at ground location 138. Group of tasks 114 identified at computer system 136 for flight crew 104 on aircraft 102 may be sent to computer system 106 on aircraft 102 for presentation to flight crew 104. In still other illustrative examples, task management tool 110 may operate on computer system 136 at ground location 138 and present group of tasks 114 to operators at ground location 138.

In yet other illustrative examples, task management tool 110 running on computer system 106 also may send group of tasks 114 to ground location 138 for viewing. Ground location 138 may be, for example, an airline dispatching facility, an air traffic control tower, an airport, and/or other suitable locations.

As yet another example, flight crew 104 may view states other than current state 118 and projected state 132. For example, flight crew 104 may review states that have already occurred. In this manner, flight crew 104 may determine whether tasks have been performed for prior times as needed. Additionally, this type of view of tasks 120 also may provide flight crew 104 an ability to review work loads for past flights.

With reference now to FIG. 2, an illustration of a block diagram for a computer system on an aircraft with a task management tool is depicted in accordance with an illustrative embodiment. In this illustrative example, an illustration of one implementation for computer system 106 is depicted.

In this illustrative example, computer system 106 comprises flight management computer 200, electronic flight bag 202, task management system 204, engine indicating and crew alerting system 206, and presentation system 208. Flight management computer 200, electronic flight bag 202, task management system 204, and engine indicating and crew alerting system 206 are number of computers 108 in computer system 106 in FIG. 1.

Flight management computer 200 provides in-flight management of a flightplan. Flight management computer 200 may guide aircraft 102 and/or flight crew 104 along a flightplan for aircraft 102 based on sensor data 122 in which sensor data 122 includes a position of aircraft 102 in FIG. 1.

Electronic flight bag 202 is an information management device to aid flight crew 104 in FIG. 1 in performing different tasks. For example, electronic flight bag 202 may include navigation charts, flight crew operation manuals, an aircraft operating manual, and other suitable types of information. Further, electronic flight bag 202 also may perform different calculations that may be used in operating aircraft 102.

Engine indicating and crew alerting system 206 provides information about various parameters in aircraft 102. For example, engine indicating and crew alerting system 206 may provide information, such as temperature, fuel flow, amount of fuel, oil pressure, and/or other suitable information from different systems. These systems may include, for example, a hydraulic system, a pneumatic system, an electrical system, an environmental system, a control surface system, and other suitable types of systems.

Task management system 204 is a computer on which task management tool 110 is located. Task management tool 110 may run on task management system 204, may be implemented as part of task management system 204, or some combination of the two.

Presentation system 208 is a hardware system. In these examples, presentation system 208 may comprise, for example, a display system, a sound system, and/or some other type of system presenting information. A display system in presentation system 208 may include, for example, number of display devices 210. Number of display devices 210 may visually display at least a portion of group of tasks 114 and/or projected group of tasks 134 in FIG. 1. In these illustrative examples, tasks in group of tasks 114 and projected group of tasks 134 may be presented using graphical user interface 214. Graphical user interface 214 is generated by task management tool 110 for display in number of display devices 210.

Further, a sound system in presentation system 208 may include, for example, number of audio devices 212. Number of audio devices 212 may generate an audible identification of at least a portion of group of tasks 114 and/or projected group of tasks 134 in FIG. 1.

In these illustrative examples, user input 131 may be received in graphical user interface 214 through number of user input devices 216. Number of user input devices 216 may include, for example, at least one of a touch screen, a mouse, a keyboard, a button, and/or some other suitable type of input device.

Additionally, computer system 106 also may receive input 220 from number of input sources 222. As one illustrative example, number of input sources 222 may include air traffic control 224. Air traffic control 224 may send input 220, such as, for example, without limitation, information identifying clearances for taxiing in and/or out of an airport or other suitable information. This information may be sent to computer system 106 on aircraft 102 from FIG. 1 using, for example, Controller Pilot Data Link Communications (CP-DLC). This information may be used by task management tool 110 to update tasks related to taxiing in and/or out of the airport.

Of course, number of input sources 222 may include other sources. For example, number of input sources 222 may be any source that sends information to computer system 106 that can be used to generate tasks, update tasks, and/or manage tasks in some other suitable manner.

The illustration of computer system 106 in FIG. 2 is not meant to imply physical or architectural limitations to the manner in which computer system 106 may be implemented. In other illustrative examples, different numbers of computers and different types of computers may be present in addition to and/or in place of the ones illustrated in this particular example.

In this illustrative example, the different computers and devices in computer system 106 are in communication with each other. The communication may be provided through different types of systems. For example, the different devices may be in communication through a network. The network may include wired and wireless communications links, depending on the particular implementation. Further, in some illustrative examples, number of user input devices 216 may be directly connected to one or more of the different computers in computer system 106.

With reference now to FIG. 3, an illustration of a task database is depicted in accordance with an illustrative embodiment. In this illustrative example, one example of an implementation for task database 116 in FIG. 1 is depicted.

As depicted, task database 116 may be centralized task database 300. Centralized task database 300 does not have to be all in one location but is configured to provide tasks 120 to many numbers and/or types of different aircraft in addition to aircraft 102 in FIG. 1.

Also, task database 116 is configured to provide tasks for any operation that is performed during different phases of flight of aircraft 102, not just those to perform function in operating aircraft 102.

In other words, task database 116 may provide tasks for substantially all of the operations performed by flight crew 104, and not just those with respect to the physical operation of aircraft 102. For example, tasks 120 may include tasks that are specific to aircraft 102 or other types of aircraft in addition to and/or in place of aircraft 102.

As illustrated, task database 116 comprises tasks 120. Tasks 120 are comprised of a number of different types of tasks. For example, tasks 120 include aircraft function tasks 302, airline tasks 304, airport tasks 306, regulatory authority tasks 308, and operator tasks 310.

Aircraft function tasks 302 include tasks that may be performed to operate different functions of aircraft 102. For example, aircraft function tasks 302 may include performing checks for landing gear, flaps, and other systems for different phases of flight.

Airline tasks 304 comprise tasks that are set out by a particular airline. Airline tasks may include, for example, without limitation, providing a status report to the airline operation center, changing a route during flight, confirming arrival at waypoints, and/or other suitable types of tasks. In addition, airline tasks 304 also may include verifying that different tasks within tasks 120 have been completed.

These phases of flight may include, for example, leaving the gate, taxiing, take off, ascending, level of flight, descending, landing, returning to a gate, and possibly other phases of flight.

Airport tasks 306 include tasks performed by the flight crew at or around an airport. For example, airport tasks 306 may include tasks for the flight crew to request clearance for taxiways, runways, and gates.

Regulatory authority tasks 308 include tasks set out by regulatory authorities. These tasks may include those set out by the Federal Aviation Authority (FAA). These tasks may be based on different phases of flight or based on receiving instructions from an air traffic control tower. An example of a task within regulatory authority tasks 308 may include, for example, providing a call out about 10 minutes before reaching a waypoint.

Operator tasks 310 are tasks that may be added through user input from the flight crew. For example, operator tasks 310 may include identifying layovers, making hotel reservations, arranging for transportation, and/or other suitable tasks that may be performed during the flight of aircraft 102.

Policy 121 comprises rules 312, which are used to identify which tasks in tasks 120 to select to form group of tasks 114 or projected group of tasks 134 in FIG. 1.

As can be seen, tasks 120 comprise more than just items to be performed in a checklist. In the illustrative examples, tasks 120 are dynamically generated based on different phases of flight, times, and events that may occur. Further, tasks 120 comprise different types of tasks and not merely those for performing functions related to operating the aircraft itself.

Rules 312 in policy 121 implement or identify requirements that may be needed for different phases of flight for aircraft 102 beyond just functions for systems in aircraft 102.

With this type of organization, centralized task database 300 may be easily updated to provide current tasks for different aircraft. For example, prior to a flight of aircraft 102, a change may occur in a task within aircraft function tasks 302. With centralized task database 300, that task may be updated. When the flight of aircraft 102 occurs, the updated task is generated for the flight crew.

This organization is in contrast to checklist systems that may be present on the aircraft. With these types of checklist systems, maintenance occurs to provide the updates. With maintenance, an aircraft may be taken out of service for some period of time.

Further, with centralized task database 300, an airline may add tasks to airline tasks 304 or to operator tasks 310. In this case, the operator may be a dispatcher providing a new task that is to be performed by the flight crew during the flight of the aircraft. As can be seen, this type of organization of tasks 120 and the processing of tasks 120 provides an improvement over checklists either in paper or electronic form.

With reference now to FIG. 4, an illustration of a group of tasks is depicted in accordance with an illustrative embodiment. In this illustrative example, group of tasks 114 includes active tasks 400, completed tasks 402, and removed tasks 404.

Active tasks 400 are tasks that have not yet been performed. Active tasks 400 include current tasks 406 and late tasks 408. Current tasks 406 are tasks that have not yet been performed but can be performed now or at some future point in time. Late tasks 408 are tasks that should be performed by the current point in time.

Completed tasks 402 are tasks that have been completed. Further, completed tasks 402 are tasks that have been completed by the flight crew. In these illustrative examples, completed tasks 402 may be identified by an operator checking off a task in active tasks 400. In other illustrative examples, task management tool 110 may use current state 118 in FIG. 1 to identify whether a pending task in active tasks 400 has been completed.

As one illustrative example, one of active tasks 400 may be for a pilot of an aircraft to notify air traffic control (ATC) about 10 minutes prior to the aircraft reaching the top of descent (TOD) for the flight of the aircraft. The top of descent is a transition between a cruise phase of flight and a descent phase of flight for the aircraft. In other words, the top of descent is the point at which a planned descent to a final approach altitude is initiated. This task may be marked as completed when the task management tool detects that the notification has been sent.

Removed tasks 404 are tasks that have been removed from active tasks 400. Removed tasks may be tasks that have not been performed. These tasks also may be late tasks 408 that have been removed from active tasks 400. Additionally, current tasks 406 may be removed and placed in removed tasks 404 based on operator input or some other process.

As one illustrative example, the task of notifying air traffic control prior to reaching the top of descent may be an optional task. If the pilot of the aircraft does not notify air traffic control at the proper time and the task management tool detects that the aircraft has already begun to descend, the task may be removed and placed in removed tasks 404.

In these illustrative examples, when a task is completed or removed, those tasks are still retained in group of tasks 114, but they are no longer pending tasks and may not be presented to the flight crew. With this type of organization of group of tasks 114, a log or history of tasks and their performance may be maintained for a particular flight. Additionally, as new tasks are identified, those tasks are added to active tasks 400 in these illustrative examples.

In this manner, a review of all tasks performed and not performed may be identified at any point in time for group of tasks 114. As a result, group of tasks 114 increases in size during the operation of aircraft 102 as additional tasks from task database 116 are identified for inclusion in group of tasks 114.

The presentation of group of tasks 114 in FIG. 1 may only be tasks that are still active. These active tasks may be presented in graphical user interface 214 in FIG. 2.

Figure 5:
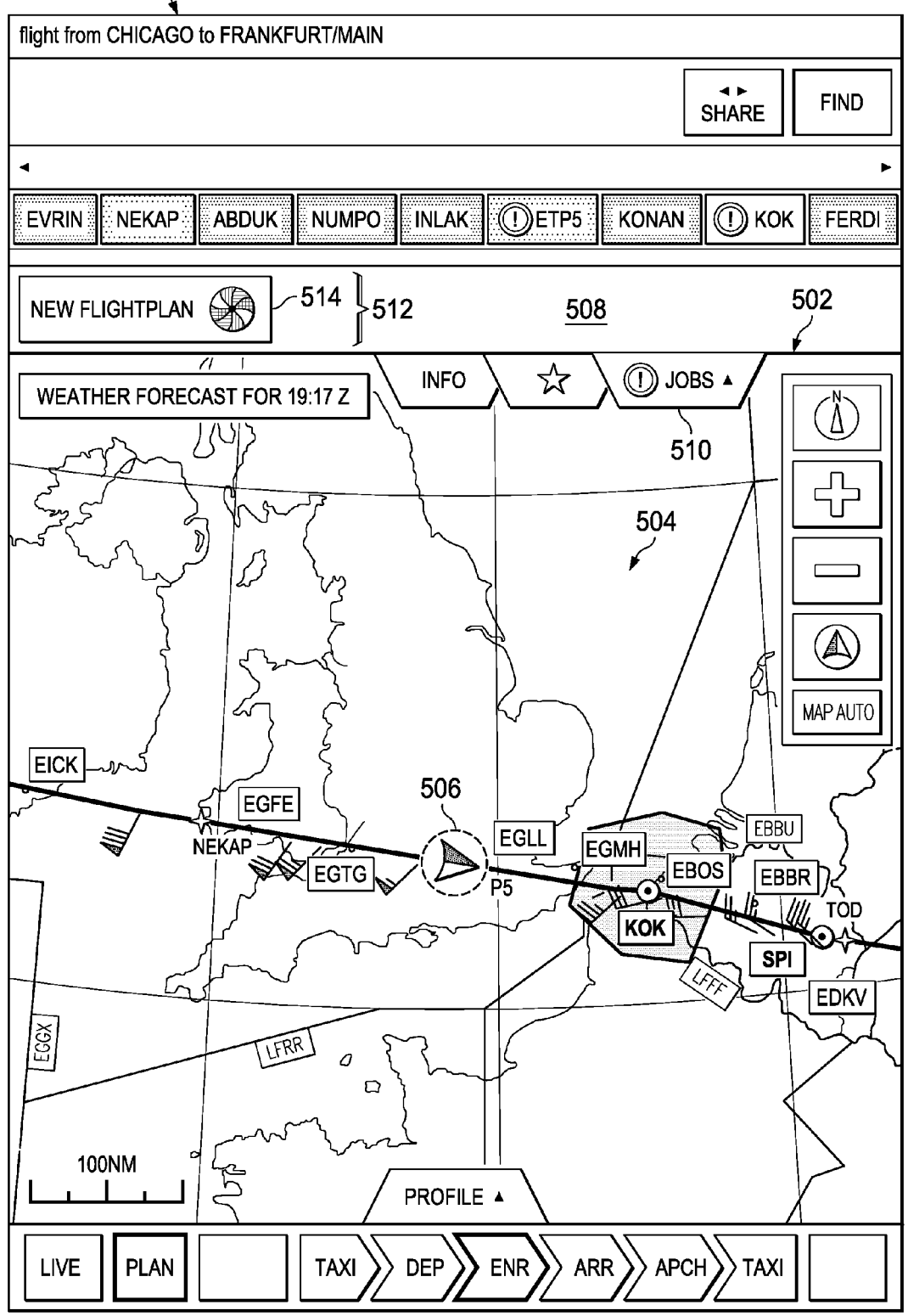
FIG. 5 is an illustration of a presentation of a group of tasks in accordance with an illustrative embodiment.

With reference now to FIG. 5, an illustration of a presentation of a group of tasks is depicted in accordance with an illustrative embodiment. In this illustrative example, graphical user interface 500 may be used to present information to a user in the form of a visual presentation. In this illustrative example, graphical user interface 500 is an example of graphical user interface 214 in FIG. 2 and is displayed on number of display devices 210 in presentation system 208 for computer system 106 in FIG. 2.

In this depicted example, section 502 includes moving map 504. Within moving map 504, graphical indicator 506 indicates a position and direction of an aircraft during flight.

Section 508 in graphical user interface 500 is displayed when jobs tab 510 is selected. The selection of jobs tab 510 results in group of tasks 512 being displayed in section 508. In this example, group of tasks 512 comprises task 514. In particular, active tasks 400 in group of tasks 114 in FIG. 4 are the tasks presented in graphical user interface 500 in this example. As depicted, a single task, task 514, is present as an active task. Task 514 indicates that the operator should prepare for a new flightplan.

Figure 6:
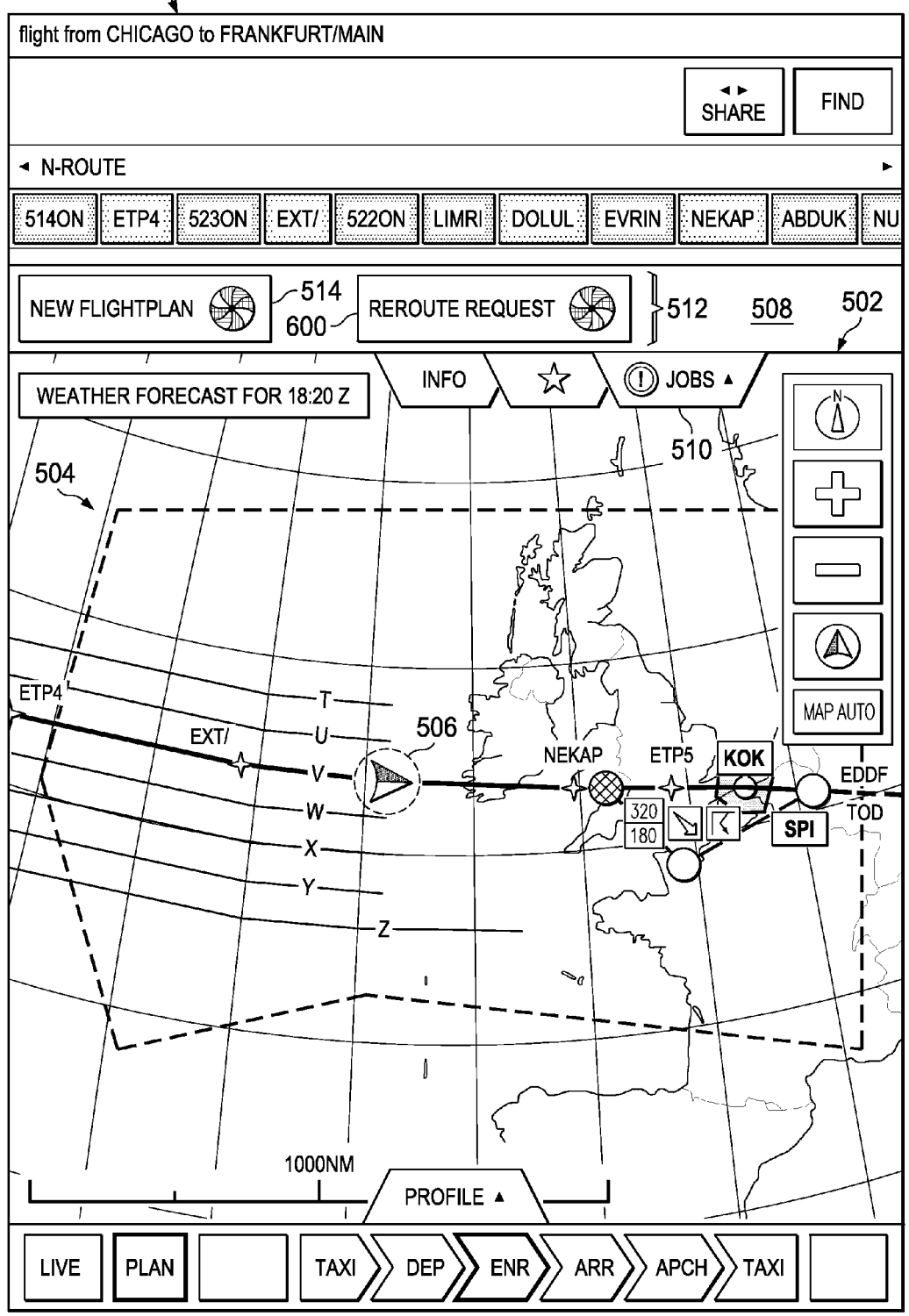
FIG. 6 is another illustration of a display of tasks in accordance with an illustrative embodiment.

With reference now to FIG. 6, another illustration of a display of tasks is depicted in accordance with an illustrative embodiment. In this example, current state 118 of aircraft 102 in FIG. 1 is changed, resulting in another task being added to group of tasks 512. As illustrated, group of tasks 512 now comprises task 514 and task 600. Task 600 indicates that the operator should perform a reroute request. This task is performed after task 514 in these examples. As new tasks are generated or identified for performance by the flight crew, these tasks may be displayed in section 508 in graphical user interface 500.

The illustrations of graphical user interface 500 in FIGS. 5 and 6 are not meant to imply limitations to the manner in which graphical user interface 500 may be displayed. For example, instead of displaying section 502, a pop-up window may be displayed in graphical user interface 500. In still other illustrative examples, group of tasks 512 may be displayed in a list form.

As another example, projected group of tasks 134 in FIG. 1 may be displayed in graphical user interface 500 in a similar fashion based on a state selected for viewing. In other words, an operator may select a point in time to see what tasks should be performed. Those tasks are displayed in graphical user interface 500 in these illustrative examples. Further, the operator may select a range of times, and graphical user interface 500 may progressively change the display as the time changes through the different periods of time to show tasks that are to be performed during that period of time.

Figure 7:
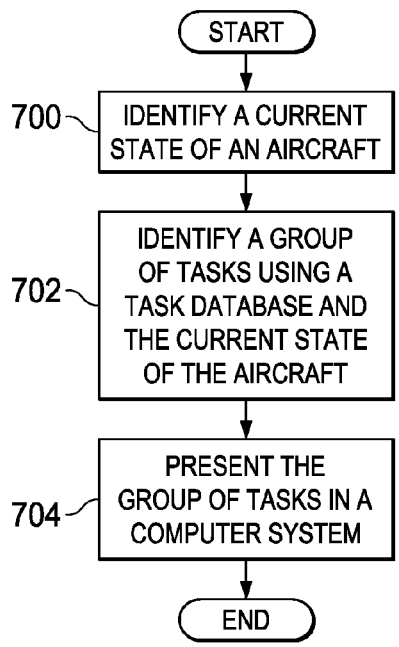
FIG. 7 is an illustration of a flowchart of a process for managing tasks in an aircraft in accordance with an illustrative embodiment.

With reference now to FIG. 7, an illustration of a flowchart of a process for managing tasks in an aircraft is depicted in accordance with an illustrative embodiment. In this illustrative example, the different operations may be implemented in task management tool 110 in FIG. 1. These different processes may be implemented in program code that is run by a computer system or in hardware in a computer system or in a device.

The process begins by identifying a current state of an aircraft (operation 700). Thereafter, the process identifies a group of tasks using a task database and the current state of the aircraft (operation 702). The task database comprises tasks for operating the aircraft by the flight crew. The process then presents the group of tasks in a computer system (operation 704), with the process terminating thereafter. In operation 704, the presentation of tasks may be made using presentation system 208 in FIG. 2. For example, at least one of number of display devices 210 and number of audio devices 212 may be used to present tasks identified in operation 702.

The process in FIG. 7 may be performed periodically. For example, this process may be initiated every second, every 10 seconds, every 60 seconds, or some other period of time.

Figure 8:
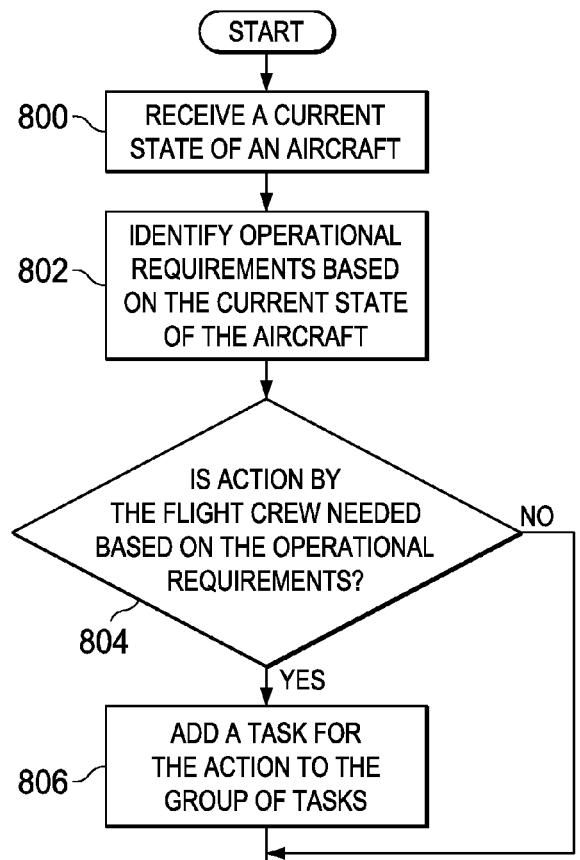
FIG. 8 is an illustration of a flowchart of a process for adding a task to a group of tasks in accordance with an illustrative embodiment.

With reference now to FIG. 8, an illustration of a flowchart of a process for adding a task to a group of tasks is depicted in accordance with an illustrative embodiment. The operations in FIG. 8 may be examples of operations that may be performed as part of operation 702 in FIG. 7.

The process begins by receiving a current state of an aircraft (operation 800). The process identifies operational requirements based on the current state of the aircraft (operation 802).

Operation 802 may be performed using policy 121 in task database 116 in FIG. 1. Policy 121 includes rules that may be used to identify tasks based on operational requirements for a flight. In these examples, in operation 802, rules applicable to the current state of the aircraft are identified from policy 121.

The operational requirements in operation 802 may be any requirements for the flight. The operational requirements may include, for example, without limitation, at least one of operations to perform functions using the different systems in the aircraft, operations performed to provide information to an air traffic controller or dispatcher, operations to request clearance or permission to perform certain actions, and other types of operations that may be performed during different phases of flight for the aircraft.

Next, a determination is made as to whether action by the flight crew is needed based on the operational requirements (operation 804). In this example, the current state for the aircraft is applied to the identified rules in the policy. If an action is required, the process adds a task for the action to the group of tasks (operation 806), with the process terminating thereafter. In this illustrative example, the adding of the task for the action to the group of tasks is as an active task, such as tasks in active tasks 400 in FIG. 4. Otherwise, if no action is required in operation 804, no tasks are added to the group of tasks, and the process terminates.

Figure 9:
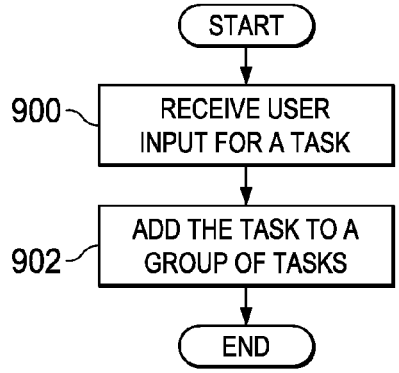
FIG. 9 is an illustration of a flowchart of a process for adding tasks to a group of tasks in accordance with an illustrative embodiment.

With reference now to FIG. 9, an illustration of a flowchart of a process for adding tasks to a group of tasks is depicted in accordance with an illustrative embodiment. The process illustrated in FIG. 9 is one that may be implemented through user input 131 received by task management tool 110 in FIG. 1. The user input may be received using number of user input devices 216 in FIG. 2. FIG. 9 is an example of one manner in which operation 702 in FIG. 7 may be implemented.

The process begins by receiving user input for a task (operation 900). The process then adds the task to a group of tasks (operation 902), with the process terminating thereafter. In operation 902, the task is added as an active task, such as active tasks 400 in FIG. 4.

The different operations in FIG. 9 may be used by operators to add tasks for a flight crew of an aircraft. These operators may include the flight crew, a dispatcher at an airline operating center, an air traffic controller, and/or some other operator.

Figure 10:
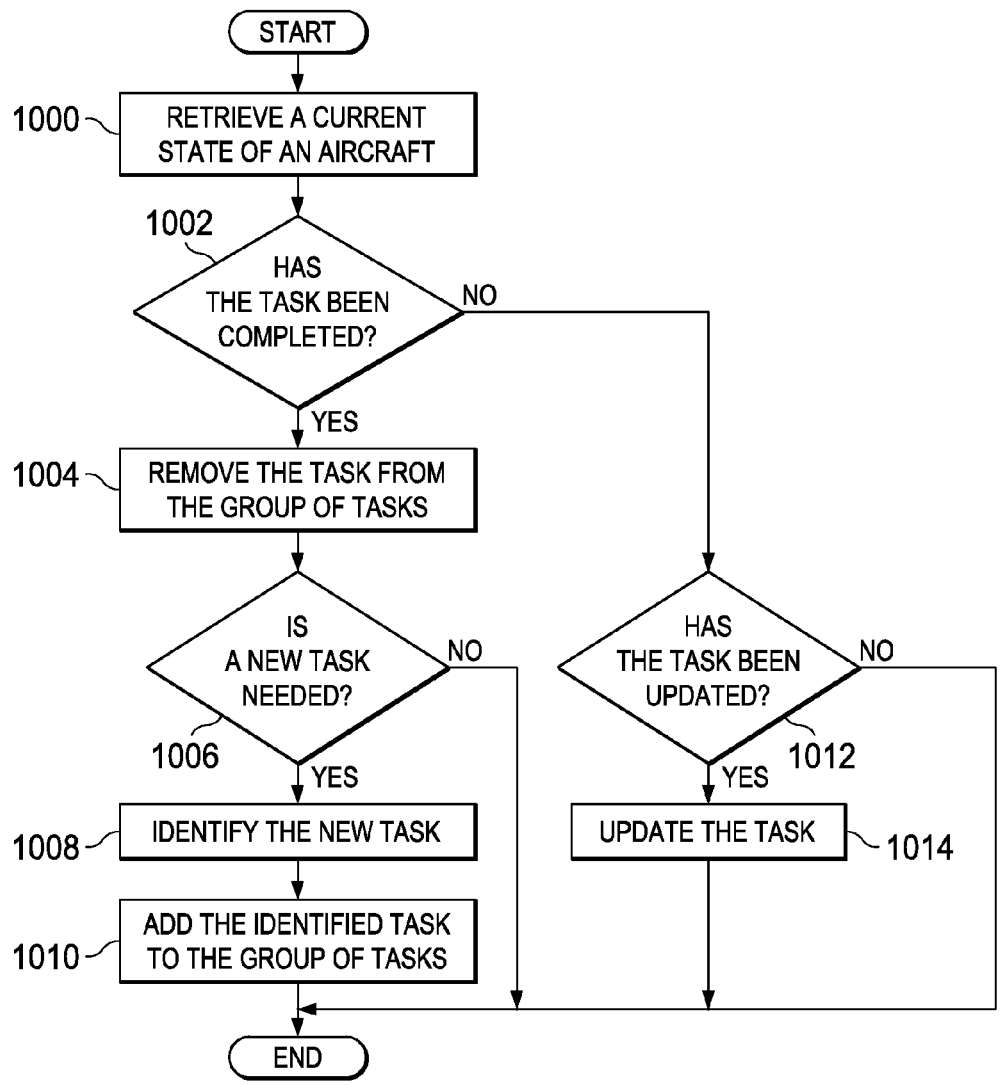
FIG. 10 is an illustration of a flowchart of a process for updating a group of tasks in accordance with an illustrative embodiment.

With reference now to FIG. 10, an illustration of a flowchart of a process for updating a group of tasks is depicted in accordance with an illustrative embodiment. The different operations illustrated in FIG. 10 may be examples of operations that may be used to update a group of tasks generated in operation 702 in FIG. 7.

The process begins by retrieving a current state of an aircraft (operation 1000). A determination is made as to whether the task has been completed (operation 1002). Operation 1002 may be performed in a number of different ways. For example, operation 1002 may be performed by receiving user input indicating that a particular task has been performed. In other illustrative examples, this operation also may be performed by task management tool 110 using current state 118 in FIG. 1. Information in current state 118 may be used to determine whether a particular task in group of tasks 114 has been performed.

For example, if the task includes making an altitude change, current state 118 may include altitude information. Task management tool 110 may check altitude information in current state 118 to determine whether the altitude change has occurred. If the altitude change has occurred, the task is considered to be completed in this illustrative example.

In operation 1002, if the task has been completed, the process removes the task from the group of tasks (operation 1004). In these illustrative examples, removing a task from the group of tasks may be performed by moving the task from active tasks 400 to removed tasks 404. In other examples, the operation may actually remove the task from the group of tasks or marking the task as having been completed.

Next, a determination is made as to whether a new task is needed (operation 1006). If a new task is needed, the process identifies the new task (operation 1008). In operation 1008, the process may use a task database to determine whether a number of additional tasks are needed. The identified task is then added to the group of tasks (operation 1010), with the process terminating thereafter.

With reference again to operation 1006, the process terminates if a new task is not needed.

With reference again to operation 1002, if the task was not completed, a determination is made as to whether the task has been updated (operation 1012). In operation 1012, the task may be updated based on a determination of whether the task still needs to be performed even though the task has not been completed. For example, if the task has not been completed, but the time for performing the task has passed, the task may be deleted if it is no longer necessary. The task may also be changed in priority, or some other action may be taken to update the task. If the task has not been updated, the process terminates. Otherwise, the process updates the task (operation 1014), with the process terminating thereafter.

The process illustrated in FIG. 10 may be run periodically. For example, this process may be run every second, every 10 seconds, every 60 seconds, or some other period of time.

Figure 11:
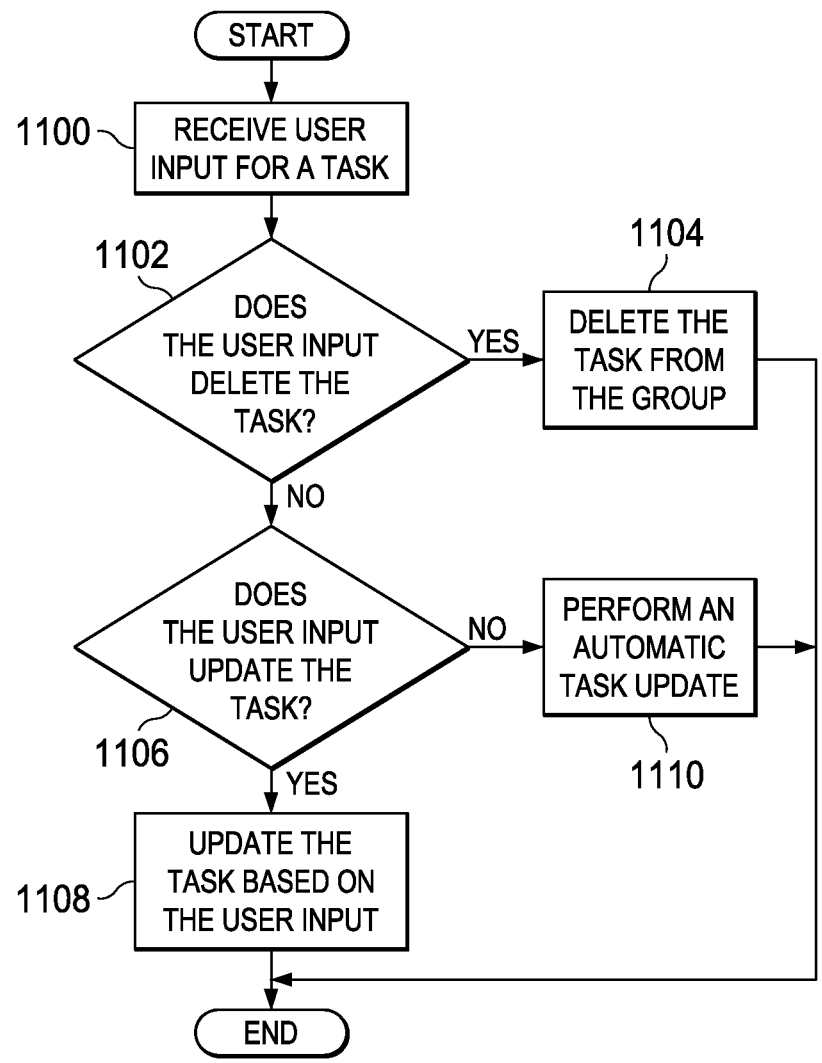
FIG. 11 is an illustration of a flowchart of a process for updating an existing task in accordance with an illustrative embodiment.

With reference now to FIG. 11, an illustration of a flowchart of a process for updating an existing task is depicted in accordance with an illustrative embodiment. The process illustrated in FIG. 11 may be implemented in task management tool 110 in FIG. 1 to update a group of tasks.

The process begins by receiving user input for a task (operation 1100). The user input received by the process in FIG. 11 may be received through number of user input devices 216 in FIG. 2.

A determination is made as to whether the user input deletes the task (operation 1102). If the user input deletes the task, the process deletes the task from the group (operation 1104), with the process terminating thereafter. This deletion may include removing the task from the group of tasks or marking the task as no longer being valid.

With reference again to operation 1102, if the user input does not delete the task, a determination is made as to whether the user input updates the task (operation 1106). If the user input updates the task, the process updates the task based on the user input (operation 1108), with the process terminating thereafter.

With reference again to operation 1106, if the user input does not update the task, the process proceeds to perform an automatic task update (operation 1110), with the process terminating thereafter. For example, in operation 1110, the task may be sending a notification to air traffic control at a selected point in time. This notification may be sent in a manner that may be detected by the task management tool. The task management tool may update the task and/or indicate that the task has been completed in response to detecting that the notification has been sent without requiring user input.

The user input in FIG. 11 also may be received from various types of operators. For example, the user input may be received from at least one of a flight crew member, a dispatcher, an air traffic controller, and/or some other suitable type of operator that is authorized to manage tasks for the flight crew.

Figure 12:
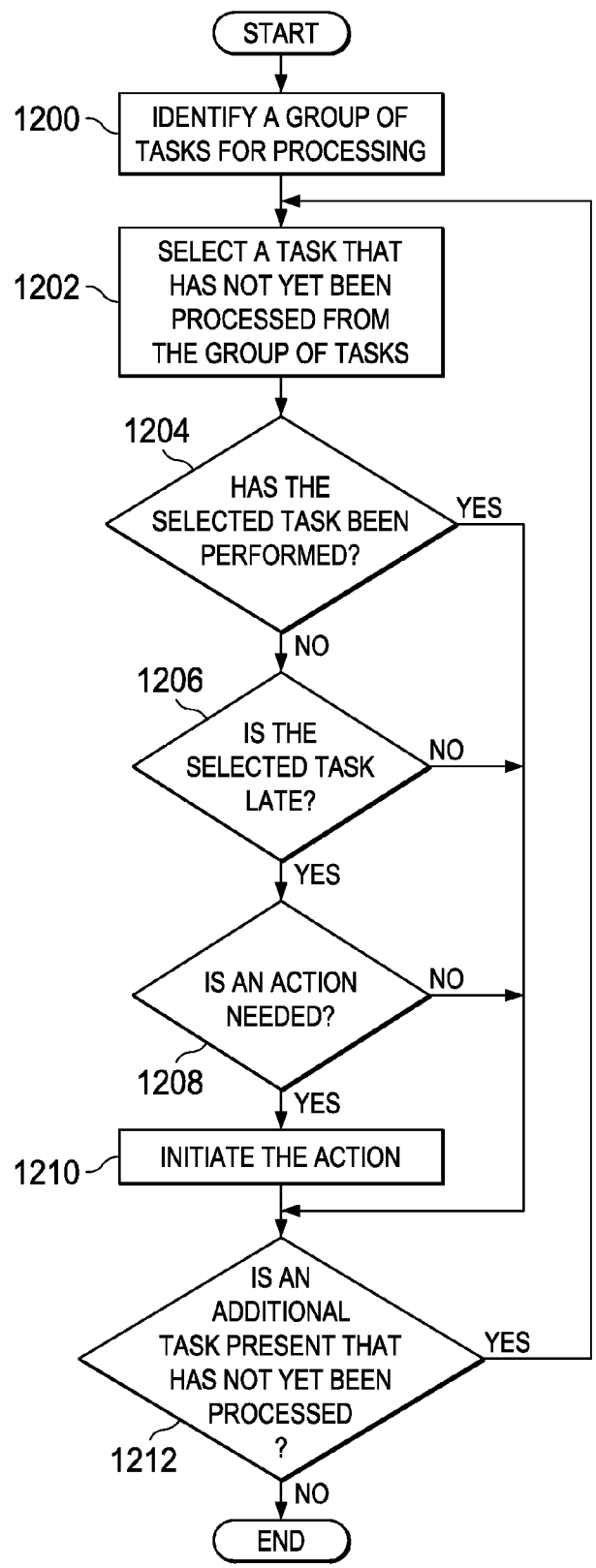
FIG. 12 is an illustration of a flowchart of a process for monitoring the performance of tasks in accordance with an illustrative embodiment.

With reference now to FIG. 12, an illustration of a flowchart of a process for monitoring the performance of tasks is depicted in accordance with an illustrative embodiment. The different operations illustrated in FIG. 12 may be implemented in a computer system, such as computer system 123 in a location remote to aircraft 102 in FIG. 1. This process may monitor the performance of tasks to determine whether additional actions are needed with respect to aircraft 102.

The process begins by identifying a group of tasks for processing (operation 1200). A task that has not yet been processed is selected from the group of tasks (operation 1202).

A determination is made as to whether the selected task has been performed (operation 1204). If the selected task has not been performed, the process determines whether the selected task is late (operation 1206). In these illustrative examples, a selected task is considered to be late if the task should have been performed at the time the check was made. Further, a selected task may be considered late when the selected task is scheduled for performance at a selected time but is not performed by the selected time.

If the selected task is late, the process determines whether an action is needed (operation 1208). If action is needed, the process initiates the action (operation 1210). The action in operation 1210 may take a number of different forms.

For example, the action may include generating an alert, generating a notification that the flight crew is to be contacted to perform a number of operations, and/or other suitable types of actions. The number of operations to be performed by the flight crew may include, for example, determining whether an issue is present, adding another task to the group of tasks for the flight crew, logging the failure to perform the task within the required amount of time, and/or other suitable types of operations.

The process then determines whether an additional task is present that has not yet been processed (operation 1212). If an additional task is present, the process returns to operation 1202 to select another task that has not yet been processed. Otherwise, the process terminates.

With reference again to operation 1208, if the task does not require an action to be taken, the process proceeds to operation 1212 as discussed above. In a similar fashion, if the selected task is not late in operation 1206 or the selected task has been performed in operation 1204, the process also proceeds to operation 1212 as described above.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, although FIG. 7 and FIG. 10 have been described as being run periodically, these processes may be run in response to an event. For example, the event may be the occurrence of a particular temperature, a weather alert, or some other suitable event.

Turning now to FIG. 13, an illustration of a data processing system is depicted in accordance with an illustrative embodiment. In this illustrative example, data processing system 1300 includes communications fabric 1302, which provides communications between processor unit 1304, memory 1306, persistent storage 1308, communications unit 1310, input/output (I/O) unit 1312, and display 1314. Data process system 1300 is an example of a data processing system that may be used to implement one or more computers in computer system 106, computer system 123, and computer system 136 in FIG. 1.

Processor unit 1304 serves to execute instructions for software that may be loaded into memory 1306. Processor unit 1304 may be a number of processors, a multi-processor core, or some other type of processor, depending on the particular implementation. A number, as used herein with reference to an item, means one or more items. Further, processor unit 1304 may be implemented using a number of heterogeneous processor systems in which a main processor is present with secondary processors on a single chip. As another illustrative example, processor unit 1304 may be a symmetric multi-processor system containing multiple processors of the same type.

Memory 1306 and persistent storage 1308 are examples of storage devices 1316. A storage device is any piece of hardware that is capable of storing information, such as, for example, without limitation, data, program code in functional form, and/or other suitable information either on a temporary basis and/or a permanent basis. Storage devices 1316 may also be referred to as computer readable storage devices in these examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these examples, provides for communications with other data processing systems or devices. In these examples, communications unit 1310 is a network interface card. Communications unit 1310 may provide communications through the use of either or both physical and wireless communications links.

Input/output unit 1312 allows for input and output of data with other devices that may be connected to data processing system 1300. For example, input/output unit 1312 may provide a connection for user input through a keyboard, a mouse, and/or some other suitable input device. Further, input/output unit 1312 may send output to a printer. Display 1314 provides a mechanism to display information to a user.

Instructions for the operating system, applications, and/or programs may be located in storage devices 1316, which are in communication with processor unit 1304 through communications fabric 1302. In these illustrative examples, the instructions are in a functional form on persistent storage 1308. These instructions may be loaded into memory 1306 for execution by processor unit 1304. The processes of the different embodiments may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these examples. In one example, computer readable media 1320 may be computer readable storage media 1324 or computer readable signal media 1326. Computer readable storage media 1324 may include, for example, an optical or magnetic disk that is inserted or placed into a drive or other device that is part of persistent storage 1308 for transfer onto a storage device, such as a hard drive, that is part of persistent storage 1308.

Computer readable storage media 1324 also may take the form of a persistent storage, such as a hard drive, a thumb drive, or a flash memory, that is connected to data processing system 1300. In some instances, computer readable storage media 1324 may not be removable from data processing system 1300. In these examples, computer readable storage media 1324 is a physical or tangible storage device used to store program code 1318 rather than a medium that propagates or transmits program code 1318. Computer readable storage media 1324 is also referred to as a computer readable tangible storage device or a computer readable physical storage device. In other words, computer readable storage media 1324 is a media that can be touched by a person.

Alternatively, program code 1318 may be transferred to data processing system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1318 may be downloaded over a network to persistent storage 1308 from another device or data processing system through computer readable signal media 1326 for use within data processing system 1300. For instance, program code stored in a computer readable storage medium in a server data processing system may be downloaded over a network from the server to data processing system 1300. The data processing system providing program code 1318 may be a server computer, a client computer, or some other device capable of storing and transmitting program code 1318.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1304 may take the form of a hardware unit that has circuits that are manufactured or configured for a particular use. This type of hardware may perform operations without needing program code to be loaded into a memory from a storage device to be configured to perform the operations.

For example, when processor unit 1304 takes the form of a hardware unit, processor unit 1304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1318 may be omitted, because the processes for the different embodiments are implemented in a hardware unit.

In still another illustrative example, processor unit 1304 may be implemented using a combination of processors found in computers and hardware units. Processor unit 1304 may have a number of hardware units and a number of processors that are configured to run program code 1318. With this depicted example, some of the processes may be implemented in the number of hardware units, while other processes may be implemented in the number of processors.

In another example, a bus system may be used to implement communications fabric 1302 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1306, or a cache, such as found in an interface and memory controller hub that may be present in communications fabric 1302.

Thus, the different illustrative embodiments provide a method and apparatus for managing tasks in an aircraft. A current state of the aircraft is identified. A group of tasks is identified using a task database in the current state of the aircraft. The task database comprises tasks for operating the aircraft by the flight crew. The group of tasks is presented in a computer system. With this presentation, the flight crew may perform tasks needed to operate the aircraft without having to manage or locate checklists. Further, as tasks are completed, the tasks are removed and do not require the user to constantly review checklists.

Additionally, the different illustrative examples are different from checklists currently used. The group of tasks selected may be different types of tasks. These tasks include tasks in addition to those needed to perform aircraft functions. In other words, the tasks include tasks other than those needed to operate different systems of the aircraft.

The different illustrative embodiments also provide an ability to automatically check for the performance of tasks. As described above, task management tool 110 may use current state 118 in FIG. 1 to determine whether a task has been performed. This process is in contrast to having a crew member acknowledge or check off each task in a checklist.

For example, group of tasks 114 in FIG. 1 also may include tasks, such as those for viewing a route clearance, requesting a change in route, and other tasks that are not part of operating systems in the aircraft.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing tasks in an aircraft, the method comprising using program code in a computer system for:
    identifying a current state of the aircraft;
    forming a group of tasks by selecting a task from a task database, based upon the current state of the aircraft and environmental information, such that the task database comprises tasks that are not an electronic checklist for a procedure; and
    presenting the group of tasks in the computer system.

2. The method of claim 1, wherein identifying the current state of the aircraft comprises:
    receiving data from a sensor system associated with the aircraft; and
    generating the current state of the aircraft using the sensor system.

3. The method of claim 1, wherein the task database comprises the tasks for performance during different phases of flight of the aircraft and the group of tasks comprises different types of tasks from the tasks.

4. The method of claim 1, wherein the group of tasks comprises aircraft function tasks, airline tasks, airport tasks, regulatory authority tasks, and operator tasks.

5. The method of claim 1, wherein presenting the group of tasks in the computer system comprises:
    displaying at least a portion of the group of tasks on a display system for the computer system.

6. The method of claim 1, wherein presenting the group of tasks in the computer system comprises:
    generating an audible identification of the group of tasks through a sound system in the computer system.

7. The method of claim 1 further comprising:
    determining whether a particular task in the group of tasks has been completed using the current state of the aircraft; and
    removing the particular task from the group of tasks in response to a determination that the task has been completed.

8. The method of claim 1 further comprises:
    identifying a projected group of tasks, responsive to a selection of a projected state for the aircraft, using the task database and the projected state for the aircraft; and
    presenting the projected group of tasks in the computer system.

9. The method of claim 1 further comprising:
    determining whether a particular task in the group of tasks scheduled for performance at a selected time that has not been performed by the selected time; and
    responsive to a presence of the particular task in the group of tasks scheduled for performance at the selected time that has not been performed by the selected time, generating an alert.

10. The method of claim 1 further comprising:
    responsive to a change in the current state of the aircraft, determining whether the group of tasks is correct using the task database and the change in the current state; and
    responsive to a determination that the group of tasks is incorrect based on the change in the current state, updating the group of tasks using the task database and the change in the current state.

11. The method of claim 2, wherein the data received from the sensor system comprises a temperature inside the aircraft, a temperature outside of the aircraft, a pressure, a position of the aircraft, a humidity level, and an oxygen level in a cabin of the aircraft.

12. The method of claim 1, wherein the computer system is located in one of the aircraft, an airport, an air traffic control tower, and an airline dispatching facility.

13. The method of claim 1, wherein the task database is a centralized database in another computer system located remotely from the aircraft.

14. The method of claim 3,
    wherein the environmental information includes one or more of current weather information, weather forecasts, and information about a status of a runway at an airport; and
    wherein the phases of flight include leaving a gate, taxiing, take off, ascending, level of flight, descending, landing, and returning to a gate.

15. A task management system comprising:
    a program code in a computer system configured to:
        identify a current state of an aircraft, and based upon the current state of the aircraft and environmental information, select a task from a task database to form a group of tasks, such that the task database comprises tasks that are not an electronic checklist for a procedure.

16. The task management system of claim 15,
wherein in identifying the current state of the aircraft, the computer system is configured to receive data from a sensor system associated with the aircraft and generate the current state of the aircraft using the sensor system; and
wherein the computer system is further configured to determine whether a particular task in the group of tasks has been completed using the current state of the aircraft and remove the task from the group of tasks in response to a determination that the task has been completed.

17. The task management system of claim 15, wherein the task database comprises the tasks for performance during different phases of flight of the aircraft and the group of tasks comprises different types of tasks from the task.

18. The task management system of claim 15, wherein the computer system is further configured to identify a projected group of tasks using the task database and a projected state for the aircraft in response to a selection of the projected state for the aircraft and present the projected group of tasks in the computer system.

19. The task management system of claim 15, wherein the computer system is further configured to determine whether a particular task in the group of tasks scheduled for performance at a selected time that has not been performed by the selected time and initiate an action in response to a presence of the task in the group of tasks scheduled for performance at the selected time that has not been performed by the selected time.

20. A computer program product comprising:
a computer readable storage medium;
first program code configured to identify a current state of an aircraft;
second program code configured to, based upon the current state of the aircraft and environmental information, select a task from a task database to form a group of tasks, such that the task database comprises tasks for performance during different phases of flight that are not an electronic checklist for a procedure; and
third program code for presenting the group of tasks in a computer system, wherein the first program code, the second program code, and the third program code are stored on the computer readable storage medium.

* * * * *